(12) United States Patent
Aguirre

(10) Patent No.: US 8,089,347 B2
(45) Date of Patent: Jan. 3, 2012

(54) VEHICLE OPERATION TERMINATION KIT FOR PREVENTING UNAUTHORIZED ACCESS OF VEHICLE

(76) Inventor: Adalberto Aguirre, Los Angeles, CA (US)

( * ) Notice: Subject to any disclaimer, the term of this patent is extended or adjusted under 35 U.S.C. 154(b) by 300 days.

(21) Appl. No.: 12/399,095

(22) Filed: Mar. 6, 2009

(65) Prior Publication Data

US 2010/0225457 A1 Sep. 9, 2010

(51) Int. Cl.
    *B60R 25/10* (2006.01)
(52) U.S. Cl. ............. 340/426.11; 340/425.5; 340/426.1
(58) Field of Classification Search ............. 340/426.11, 340/425.5, 426.1, 426.12, 426.16, 426.19–426.21, 340/426.3, 426.35, 426.36; 307/10.1–10.6
See application file for complete search history.

(56) References Cited

U.S. PATENT DOCUMENTS

| | | | | |
|---|---|---|---|---|
| 4,545,343 A * | 10/1985 | Cook et al. | | 307/10.5 |
| 4,901,054 A * | 2/1990 | Waterman | | 340/426.36 |
| 5,360,997 A | 11/1994 | Watson | | |
| 5,494,130 A * | 2/1996 | Foster | | 340/426.11 |
| 5,563,453 A * | 10/1996 | Nyfelt | | 307/10.2 |
| 5,602,426 A * | 2/1997 | Ecker | | 307/10.2 |
| 5,612,878 A * | 3/1997 | Joao et al. | | 307/10.2 |
| 5,635,901 A * | 6/1997 | Weinblatt | | 340/426.12 |
| 5,874,889 A * | 2/1999 | Higdon et al. | | 340/426.36 |
| 6,018,291 A * | 1/2000 | Marble et al. | | 340/426.12 |
| 6,833,785 B2 * | 12/2004 | Brown et al. | | 340/426.12 |
| 7,551,064 B2 * | 6/2009 | Pudelko et al. | | 340/426.1 |
| 7,850,078 B2 * | 12/2010 | Christenson et al. | | 340/5.61 |
| 2004/0135680 A1 | 7/2004 | Jacobs | | |
| 2004/0233046 A1 * | 11/2004 | Gotfried et al. | | 340/426.1 |
| 2005/0195069 A1 * | 9/2005 | Dunand | | 340/426.11 |
| 2006/0244575 A1 * | 11/2006 | Ramirez et al. | | 340/426.35 |

* cited by examiner

*Primary Examiner* — Eric M Blount
(74) *Attorney, Agent, or Firm* — Jerry D. Haynes; The Law Office of Jerry D. Haynes

(57) ABSTRACT

A vehicle operation termination kit for rendering a vehicle inoperable for preventing unauthorized access thereof. The vehicle operation termination kit includes an enclosure, and a digital controller assembled within the enclosure. The digital controller is communicably coupled to a fuel pump and an ignition switch of the vehicle. The digital controller includes a receiver configured to receive an authorization code, and generate a first signal upon non-receipt of the authorization code. Moreover, the digital controller includes a timer communicably coupled to the receiver. The timer is configured to transmit a second signal to the fuel pump after a predetermined time delay from the generation of the first signal. The fuel pump of the vehicle is adapted to terminate operation upon receipt of the second signal, thereby rendering the vehicle inoperable.

8 Claims, 3 Drawing Sheets

VEHICLE OPERATION TERMINATION KIT FOR PREVENTING UNAUTHORIZED ACCESS OF VEHICLE

FIELD OF THE INVENTION

The present invention relates generally to systems for preventing unauthorized access of vehicles, and more particularly, to a vehicle operation termination system that renders a vehicle inoperable for preventing unauthorized access of the vehicle.

BACKGROUND OF THE INVENTION

Over the years, instances of stealing and hijacking of vehicles have increased tremendously. The stealing of vehicles not only results in a direct loss of private property but also results in an indirect loss of wealth of the society by way of insurance costs. Moreover, the hijacking of vehicles, often results in injuries (which are sometimes fatal) to owners of the vehicles.

Typically, thieves steal unattended vehicles by breaking into ignition of the unattended vehicles using various hot-wiring techniques. Moreover, hijackers usually hijack (or "carjack") vehicles from deserted stretches by stopping approaching vehicles, threatening owners of the vehicles with weapons, compelling the owners to abandon the vehicles, and fleeing with the vehicles. Accordingly, there is a need for developing a system that may be useful in preventing stealing and hijacking of vehicles.

Various conventional systems have been developed for preventing stealing and hijacking of vehicles. For example, car alarms and steering wheel locks are commonly employed to prevent stealing and hijacking of vehicles. However, the conventional systems have been ineffective in ensuring that the owners of the vehicles are completely out of harm's way before the stealing and hijacking of the vehicles are prevented. Further, the conventional systems have been difficult to operate, and are expensive to use. Moreover, most of the conventional systems are susceptible to tampering, which means that the thieves stealing the vehicles are successfully able to tamper with the conventional systems thereby rendering the conventional systems inoperable.

Therefore, there exists a need to develop an effective system for preventing unauthorized access of vehicles. Further, there exists a need to develop a system that ensures that the owners of the vehicles are completely out of the harms way before the stealing and hijacking of vehicles are prevented. Moreover, the system should be easy to operate, inexpensive to use, and totally secure from any kind of tampering.

SUMMARY OF THE INVENTION

In view of the foregoing disadvantages inherent in the prior art, the general purpose of the present invention is to provide a vehicle operation termination system that may be employed in a vehicle for preventing unauthorized access of the vehicle, which includes all the advantages of the prior art, and overcomes the drawbacks inherent therein.

Accordingly, an object of the present invention is to provide a vehicle operation termination system for preventing unauthorized access of a vehicle by rendering the vehicle inoperable.

Another object of the present invention is to provide an easy to operate, and an inexpensive vehicle operation termination system for preventing unauthorized access of the vehicle.

Yet another object of the present invention is to provide a vehicle operation termination system, which ensures that the owner of the vehicle is completely out of harms way before the unauthorized access of the vehicle is prevented.

Still another object of the present invention is to provide a vehicle operation termination system that is totally secure to any kind of tampering.

In light of the above objects, the present invention discloses a vehicle operation termination system and a kit therefor for rendering a vehicle inoperable for preventing unauthorized access thereof. The vehicle includes a fuel pump and an ignition switch. The vehicle operation termination kit includes an enclosure, which may be configured to a portion of the vehicle. Further, the vehicle operation termination kit includes a digital controller assembled within the enclosure. The digital controller is communicably coupled to the fuel pump and the ignition switch of the vehicle. The digital controller includes a receiver configured to receive an authorization code, and generate a first signal upon non-receipt of the authorization code. Further, the digital controller includes a timer communicably coupled to the receiver. The timer is configured to transmit a second signal to the fuel pump after a predetermined time delay from the generation of the first signal. The fuel pump of the vehicle is adapted to terminate operation upon the receipt of the second signal, thereby rendering the vehicle inoperable.

In another aspect, the present invention discloses a vehicle operation termination system for rendering a vehicle inoperable for preventing unauthorized access thereof. The vehicle includes a fuel pump and an ignition switch. The vehicle operation termination system includes a distress switch configured to operate based on a user input. Further, the vehicle operation termination system includes a digital controller communicably coupled to the fuel pump and the ignition switch of the vehicle, and the distress switch. The digital controller includes a receiver configured to generate a first signal upon operation of distress switch. Further, the digital controller includes a timer communicably coupled to the receiver. The timer is configured to transmit a second signal to the fuel pump after a predetermined time delay from the generation of the first signal. The fuel pump of the vehicle is adapted to terminate operation upon the receipt of the second signal, thereby rendering the vehicle inoperable.

In yet another aspect, the present invention discloses a digital controller for rendering a vehicle inoperable for preventing unauthorized access thereof. The vehicle includes a fuel pump and an ignition switch. The digital controller is communicably coupled to the fuel pump and the ignition switch of the vehicle. Further, the digital controller includes a receiver configured to receive an authorization code, and generate a first signal upon non-receipt of the authorization code. Furthermore, the digital controller includes a timer communicably coupled to the receiver. The timer is configured to transmit a second signal to the fuel pump after a predetermined time delay from the generation of the first signal. The fuel pump of the vehicle is adapted to terminate operation upon the receipt of the second signal, thereby rendering the vehicle inoperable.

These together with other embodiments of the present invention, along with the various features of novelty that characterize the present invention, are pointed out with particularity in the claims annexed hereto and form a part of this disclosure. For a better understanding of the present invention, its operating advantages, and the specific objects attained by its uses, reference should be made to the accompanying drawings and the descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, in which:

Like reference numerals refer to like parts throughout the description of the drawings.

DETAILED DESCRIPTION OF THE INVENTION

The exemplary embodiments described herein detail for illustrative purposes are subject to many variations in structure and design. It should be emphasized, however, that the present invention is not limited to a particular vehicle operation termination system, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The use of "including," "comprising," or "having" and variations thereof herein is meant to encompass the items listed thereafter and equivalents thereof as well as additional items. Unless limited otherwise, the terms "configured," "disposed," and variations thereof herein are used broadly and encompass direct and indirect attachments, couplings, and engagements. In addition, the terms "attached" and "coupled" and variations thereof are not restricted to physical or mechanical attachments or couplings.

The present invention relates to a vehicle operation termination kit. The disclosed vehicle operation termination kit is useful for rendering a vehicle inoperable. Accordingly, the vehicle operation termination kit may be used to prevent an unauthorized access of the vehicle.

Figure 1:
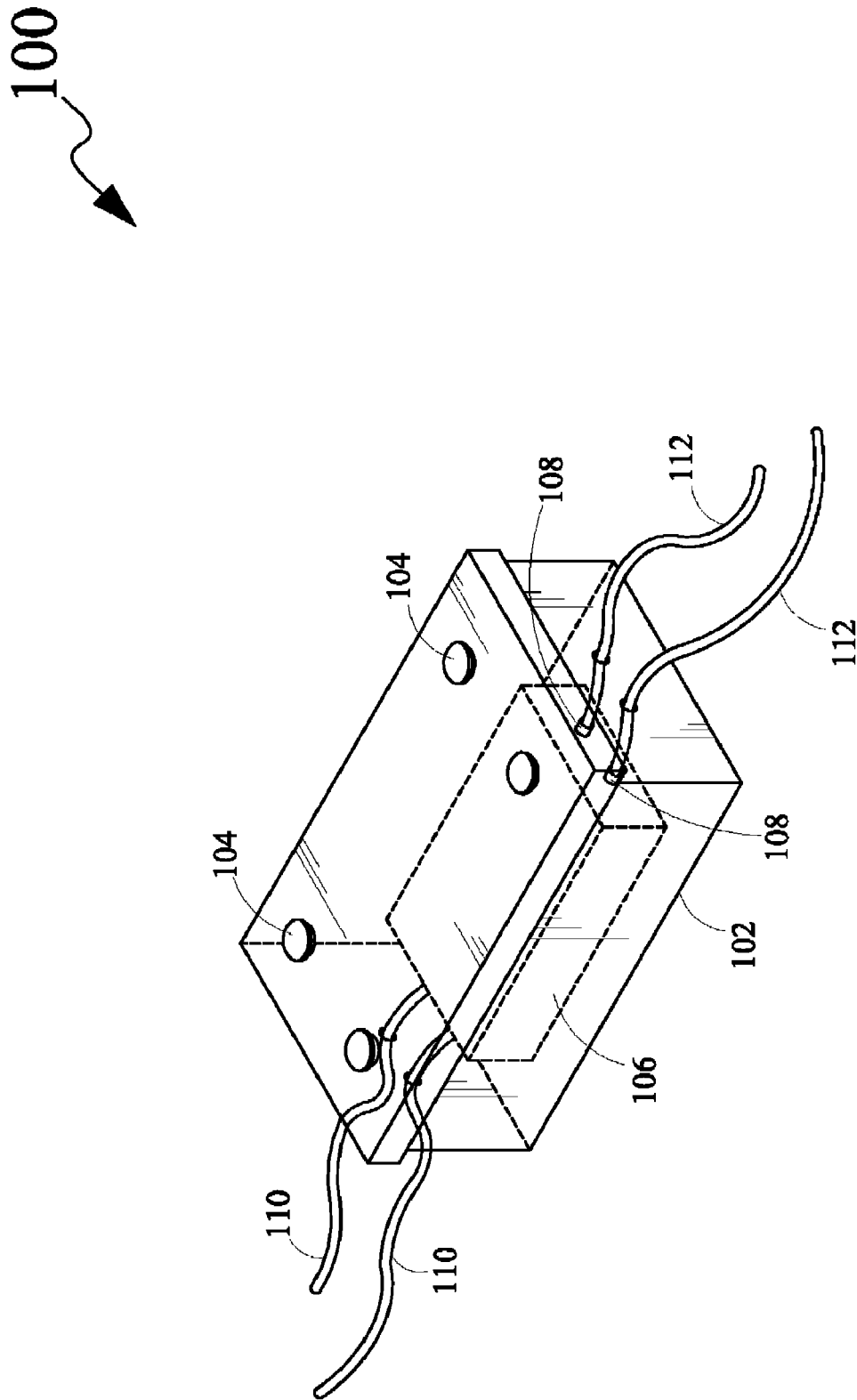
FIG. 1 depicts a perspective view of a vehicle operation termination kit, for rendering a vehicle inoperable for preventing unauthorized access thereof, according to an exemplary embodiment of the present invention.

FIG. 1 depicts a vehicle operation termination kit 100 for rendering a vehicle (not shown) inoperable for preventing unauthorized access thereof, according to an exemplary embodiment of the present invention. The term 'vehicle' mentioned herein refers to automobiles, such as cars, and trucks. It will be apparent to a person skilled in the art that such a vehicle usually includes a fuel pump for delivering fuel to an engine of the vehicle. Further, such a vehicle includes an ignition switch, which is responsible for activating a power supply that provides power to the fuel pump and to various other components of the engine of the vehicle. Hence, turning on the ignition switch turns on the engine of the vehicle, thereby rendering the vehicle operable.

The vehicle operation termination kit 100 is capable of being communicably coupled to the ignition switch (not shown in FIG. 1) and the fuel pump (not shown in FIG. 1) of the vehicle. More specifically, the vehicle operation termination kit 100 of the present invention may be communicably coupled to the ignition switch and a power supply line of the fuel pump of the vehicle. It will be apparent to a person skilled in the art that the power supply line is responsible for delivering power to the fuel pump from the power supply of the vehicle, thereby ensuring continuous operation of the fuel pump. It should be understood that the term 'communicably coupled' and variations thereof mentioned herein and throughout the detailed description, refers to attachments of two or more elements so that the two or more elements are capable of exchanging electrical signals therebetween. For the purpose of this description, the communicable coupling is provided using wires or cables. However, it should be clearly understood that such a use of wires or cables should not be construed as a limitation to the present invention.

As shown in FIG. 1, the vehicle operation termination kit 100 includes an enclosure 102. The enclosure 102 is capable of being secured to a portion of the vehicle. For example, the enclosure 102 may be capable of being secured to a portion, and more specifically, to a portion, which is out of sight of a user of the vehicle.

The enclosure 102 of the present invention may be composed of a high strength material, such as a metal, and an alloy. The use of high strength material in the enclosure 102 ensures that contents within the enclosure 102 are secure from any kind of tampering. For the purpose of this description, the enclosure 102 is assumed to be a high-strength metal box composed of a metal, such as titanium, aluminum, and iron.

In addition, the enclosure 102 includes a plurality of specialty screws 104 (hereinafter referred to as 'specialty screws 104'). The specialty screws 104 are customized to completely seal the enclosure 102, thereby barring access of the contents of the enclosure 102 to persons intending to steal the vehicle.

The vehicle operation termination kit 100 further includes a digital controller 106 assembled within the enclosure 102. It should be understood that the vehicle operation termination kit 100 may be communicably coupled to the ignition switch and the fuel pump (as mentioned above) through the digital controller 106. More specifically, the digital controller 106 may include a pair of input ports (not shown) and a pair of output ports 108. The pair of input ports of the digital controller 106 may be coupled to the ignition switch using input cables 110. Further, the pair of output ports 108 of the digital controller 106 may be coupled to the fuel pump, and more specifically, the power supply line of the fuel pump, using output cables 112. It will be apparent to a person skilled in the art that the digital controller 106 may derive power from the ignition switch. More specifically, the turning on of the ignition switch of the vehicle may power the digital controller 106. The digital controller 106 of the present invention will be explained further in detail with reference to FIG. 2.

Figure 2:
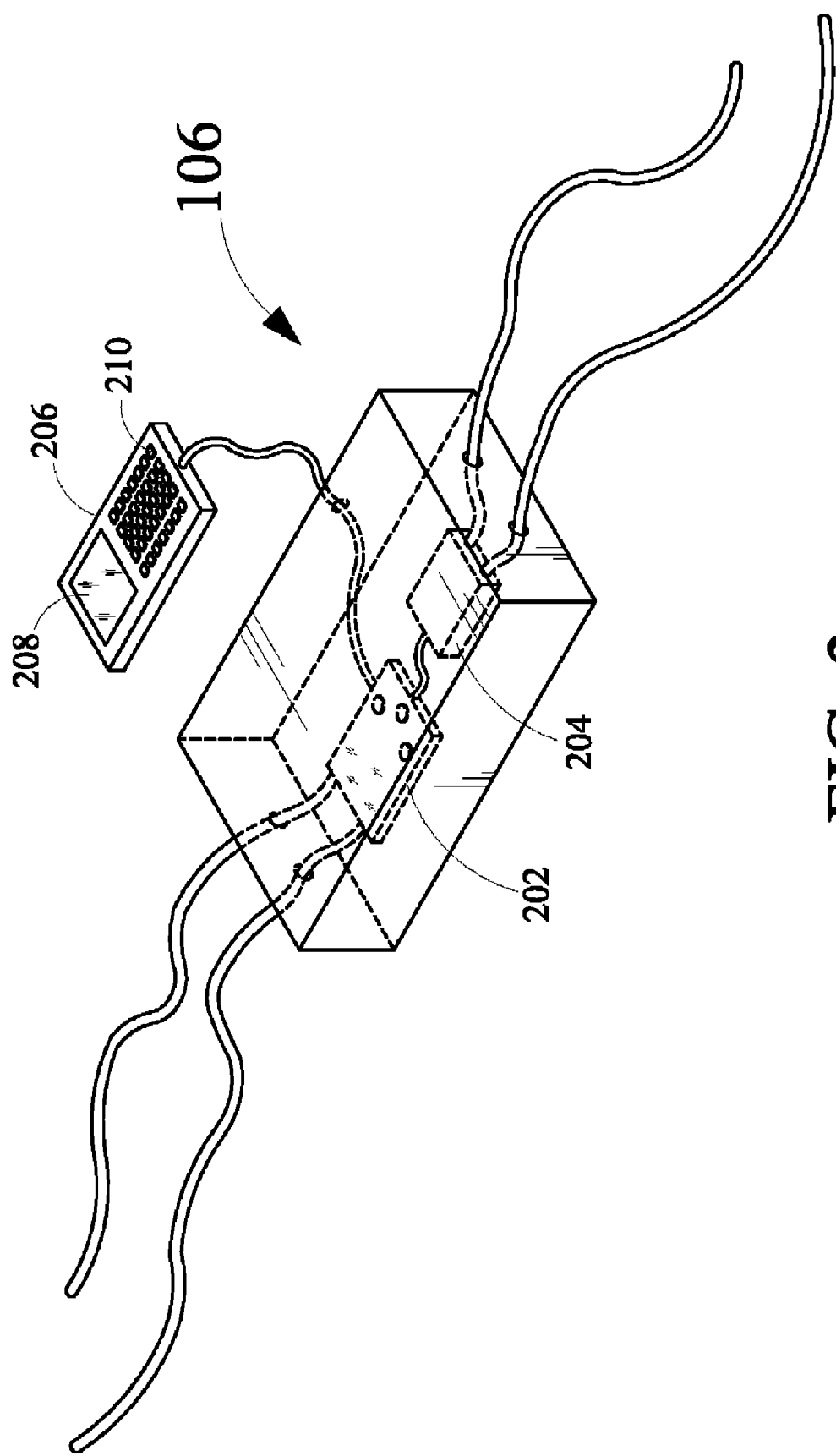
FIG. 2 depicts a perspective view of a digital controller employed in the vehicle operation termination kit, according to an exemplary embodiment of the present invention.

As shown in FIG. 2, the digital controller 106 includes a receiver 202, and a timer 204 communicably coupled to the receiver 202. Further, the digital controller 106 may include a user interface 206 communicably coupled to the receiver 202. The user interface 206 may act as a medium for interaction between the receiver 202 (and in a way vehicle operation termination kit 100) and the user of the vehicle.

The receiver 202 is configured to receive an authorization code, which is unique to the vehicle. More specifically, the receiver 202 is configured to receive the authorization code from the user of the vehicle. It should be understood that the 'authorization code' mentioned herein refers to a string that may include a combination of numbers, a combination of letters, or a combination of numbers and letters. Further, it should be understood that a person authorized to use the vehicle would be informed about the authorization code. Such a person may be referred to as an 'authorized user' hereinafter. Further, it should be understood that the authorized user of the vehicle may be either owner/owners of the vehicle, or any person whom the owner/owners have authorized to use the vehicle. Similarly, it should be understood that a person who is not authorized to use the vehicle is considered to be uninformed about the authorization code and may be referred to as an 'unauthorized user' of the vehicle.

When the user of the vehicle turns on the ignition switch of the vehicle, the receiver 202 is activated. Upon activation of the receiver 202, the user may be prompted to input the authorization code. Such a request may be displayed at a display screen 208 of the user interface 206. Accordingly, on receiving the request for entering the authorization code, the user may enter the authorization code. In an embodiment of the present invention, the user may be prompted to enter the authorization code by means of a key pad 210 of the user interface 206.

In case, an inappropriate authorization code is received at the receiver 202, a first signal is generated by the receiver 202. In an embodiment of the present invention, the first signal is generated in response to receiving inappropriate authorization code consecutively a predetermined number of times by the receiver 202. It should be understood that the generation of 'first signal' herein refers to a 'distress signal' transmitted by the receiver 202, suggesting that an unauthorized user is attempting to access the vehicle.

The receiver 202 is further configured to compare the authorization code entered by the user to a predetermined authorization code. It will be apparent to a person skilled in the art that the 'predetermined authorization code' mentioned herein may be referred to a string already stored in the receiver 202, and more specifically, in a memory of the receiver 202. If the authorization code entered by the user is same as the predetermined authorization code, the receiver 202 may allow the ignition switch to turn on the engine of the vehicle. However, if the authorization code entered by the user is incomparable to the predetermined authorization code, the receiver 202 may generate an error message and display the error message on the display screen 208 of the receiver 202. After the generation of the error message, the receiver 202 may allow the user to input the authorization code up to the predetermined number of times. In case, the authorization code entered by the user is distinct from the predetermined authorization code for a predetermined number of times, the receiver 202 generates the first signal, and transmits the first signal to the timer 204.

In another embodiment of the present invention, the first signal is generated when the receiver 202 senses a loss in power supplied to the digital controller 106 through the ignition switch. More specifically, an unauthorized user trying to gain an access of the vehicle may break into ignition switch of the vehicle, thereby resulting in the loss of the power supplied by the ignition switch to the digital controller 106. Upon detection of the loss of power supplied by the ignition switch, the receiver 202 generates the first signal, and transmits the first signal to the timer 204.

Upon generation of the first signal, the receiver 202 temporarily allows the ignition switch to turn on the engine of the vehicle, thereby rendering the vehicle operable to drive. In response to generation of the first signal, the timer 204 is activated. More specifically, the timer 204 transmits a second signal to the fuel pump after the predetermined time delay from the generation of the first signal by the receiver 202. It should be understood that the 'second signal' mentioned herein refers to a 'cut-off' signal that suggests the fuel pump of the vehicle to terminate operation thereof. It will be apparent to a person skilled in the art that the timer 204 described herein may include relay switches and other components known in art that are capable of transmitting the second signal only at the predetermined time delay upon the generation of the first signal.

Upon the receipt of the second signal, the fuel pump is adapted to terminate operation thereof. More specifically, the power supply line of the fuel pump on receipt of the second signal terminates the power supplied to the fuel pump thereby ceasing operation thereof. Consequently, the engine of the vehicle is starved of fuel, and becomes inoperable thereby rendering the vehicle inoperable.

It should be understood that the transmission of the second signal by the timer 204 to the fuel pump takes place only at the predetermined time delay. This may result in a time lag between the moment of time the unauthorized access of the vehicle happens and the moment of time the vehicle is rendered inoperable. Preferably, the predetermined time delay is less than one minute to about 3 minutes, however, the predetermined time delay may have other values as well, without departing from the scope of the present invention. Consequently, the unauthorized user of the vehicle is able to operate the vehicle for some time, but is unable to flee with the vehicle. This ensures that the owner of the vehicle is completely out of harms way before the vehicle becomes inoperable.

In an embodiment of the present invention, the vehicle operation termination kit 100 may utilize a distress switch to generate the first signal. Such an embodiment of the present invention will now be described in conjunction with FIG. 3.

Figure 3:
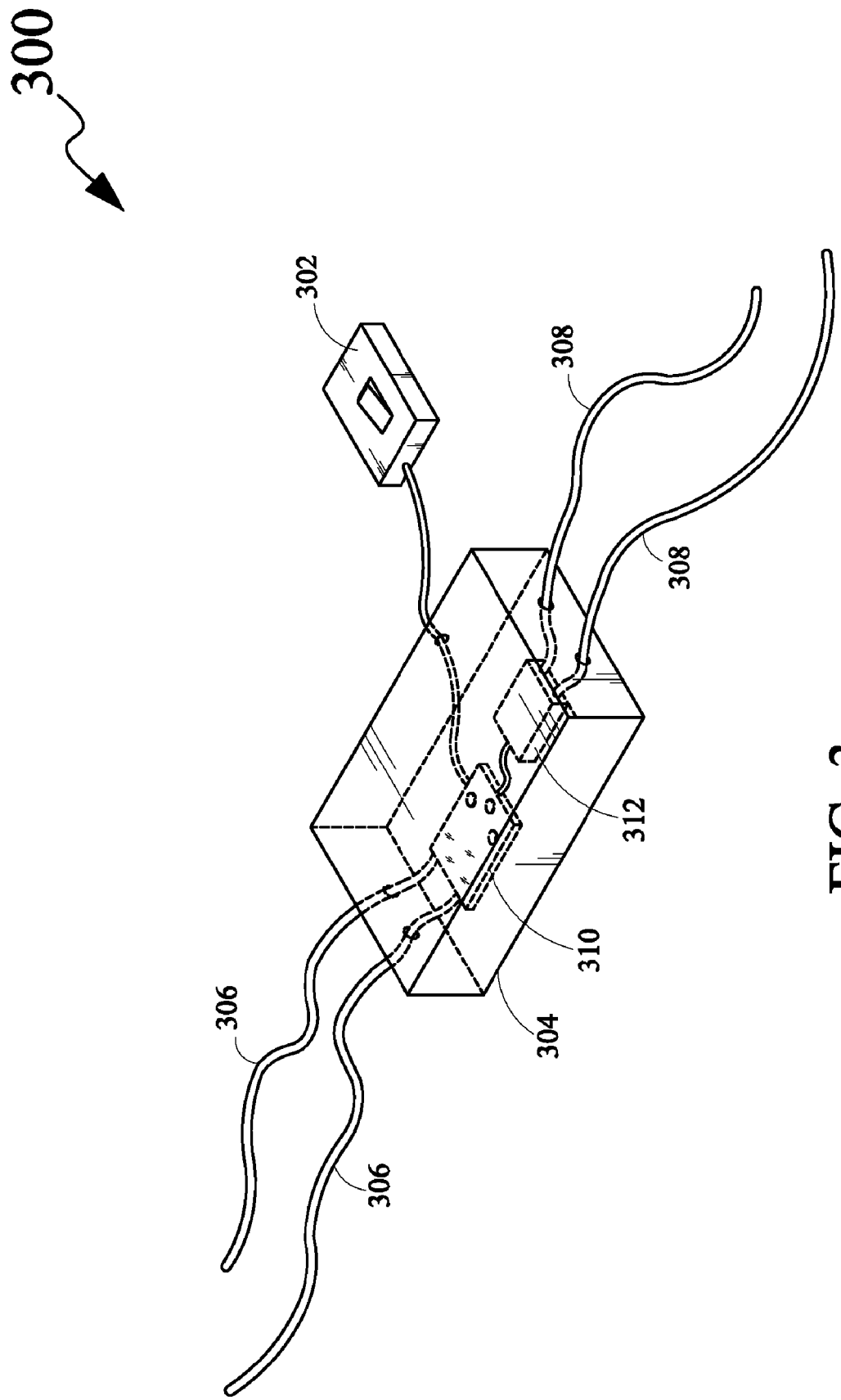
FIG. 3 depicts a perspective view of a vehicle operation termination system, for rendering a vehicle inoperable for preventing unauthorized access thereof, according to an exemplary embodiment of the present invention.

In FIG. 3, a vehicle operation termination system 300 is shown. The vehicle operation termination system 300 is capable of rendering a vehicle inoperable for preventing unauthorized access thereof. It should be clearly understood that like the vehicle operation termination kit 100, the vehicle operation termination system 300 (hereinafter may be referred to as system 300) is capable of being communicably coupled to the fuel pump and the ignition switch of the vehicle. Moreover, it should be understood that such communicable coupling is similar to the communicable coupling described with reference to the vehicle operation termination kit 100 of FIG. 1.

The system 300 includes a distress switch 302, and a digital controller 304 communicably coupled to the distress switch 302. Input of the digital controller 304 is communicably coupled to the ignition switch through input cables 306, similar to the input cables 110, as described above. Further, output of the digital controller 304 is communicably coupled to the fuel pump through output cables 308, similar to output cables 112, as described above. Further, the distress switch 302 is configured to operate based on a user input. More specifically, the distress switch 302 is configured to operate when the user presses the distress switch 302. It should be understood that the distress switch 302 may be configured to a portion of the vehicle, and more specifically, a portion, which is hidden from the unauthorized user. For example, the distress switch 302 may be concealed below a seat of the vehicle by attaching the distress switch 302 below the seat of the vehicle.

The digital controller 304 includes a receiver 310, and a timer 312 communicably coupled to the receiver 310. It should be understood that the digital controller 304 may also include a user interface, similar to the user interface 206 described with reference to the description of digital controller 106, for providing interaction between the user and the digital controller 304.

The receiver 310 is configured to generate a first signal upon the operation of the distress switch 302. Accordingly, if the authorized user of the vehicle operates the distress switch 302 by pressing the distress switch 302 (which may be the case when the unauthorized user of the vehicle is trying to hijack the vehicle); the receiver 310 generates the first signal and transmits the first signal to the timer 312.

It should be clearly understood that the timer 312, as mentioned herein, is similar to the timer 204 described with reference to the description of digital controller 106. Accordingly, in light of the description of the timer 204 above, the timer 312 upon receipt of the first signal may transmit a second signal to the fuel pump at a predetermined time delay from the generation of the first signal by the receiver 310.

The fuel pump, and more specifically the power supply line of the fuel pump, upon receipt of the second signal is adapted to terminate its operation thereby rendering the vehicle inoperable. Consequently, the vehicle becomes inoperable after the predetermined time delay, ensuring that the owner of the vehicle is completely out of harms way before the vehicle has been rendered inoperable.

It should be understood that after the vehicle operation termination kit 100 or the vehicle operation termination system 300, as described above, render the vehicle inoperable, the vehicle may again become operational only after the user enters an authorization code, which is same as the predetermined authorization code stored in the vehicle operation termination kit 100 or the vehicle operation termination system 300. Therefore, the receiver, such as the receiver 202 and the receiver 310 may be further configured to receive an authorization code after the fuel pump of the vehicle has been rendered inoperable, and restore the operation of the fuel pump of the vehicle based on the receipt of the authorization code. This ensures that the vehicle becomes operational only after the authorized user enters the appropriate authorization code into the vehicle operation termination kit 100 or the vehicle operation termination system 300.

Based on the foregoing, the present invention provides a system, such as vehicle operation termination system 300 and vehicle operation termination kit 100 (hereinafter collectively referred to as the disclosed system), for rendering a vehicle inoperable for preventing unauthorized access thereof. The disclosed system of the present invention is capable of being easily installed within the vehicle. Further, the disclosed system is very easy to operate and inexpensive. Moreover, the disclosed system is totally secure from any kind of tampering, especially hot-wiring, by any unauthorized user of the vehicle thereby ensuring a complete protection thereof. In addition, the disclosed system completely ensures that an owner of the vehicle or any authorized user thereof is completely out of the harm's way before the unauthorized access of vehicle is prevented by rendering the vehicle inoperable.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and thereby enable others skilled in the art to best utilize the present invention and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present invention.

What is claimed is:

1. A vehicle operation termination kit for rendering a vehicle inoperable for preventing unauthorized access of the vehicle, the vehicle comprising a fuel pump and an ignition switch, the vehicle operation termination kit comprising:
   an enclosure capable of being configured to a portion of the vehicle; and
   a digital controller assembled within the enclosure, the digital controller capable of being communicably coupled to the fuel pump and the ignition switch, the digital controller comprising:
   a receiver configured to:
      receive an authorization code, the authorization code being unique to the vehicle upon the turning of the ignition switch, and
      generate a first signal upon non-receipt of the authorization code after the turning of the ignition switch, and
   a timer communicably coupled to the receiver, the timer configured to transmit a second signal to the fuel pump after a predetermined time delay from the generation of the first signal, where the second signal indicates the non-receipt of the authorization code,
   wherein upon receipt of the second signal by the fuel pump, the fuel pump is adapted to terminates operation, thereby rendering the vehicle inoperable.

2. The vehicle operation termination kit of claim 1, wherein the digital controller is communicably coupled to a power supply line of the fuel pump.

3. A digital controller for rendering a vehicle inoperable for preventing unauthorized access of the vehicle, the vehicle comprising a fuel pump and an ignition switch, the digital controller capable of being communicably coupled to the fuel pump and the ignition switch, the digital controller comprising:
   a receiver configured to:
      receive an authorization code, the authorization code being unique to the vehicle upon the turning of the ignition switch, and
      generate a first signal upon non-receipt of the authorization code; and
   a timer communicably coupled to the receiver, the timer configured to transmit a second signal to the fuel pump after a predetermined time delay from the generation of the first signal where the second signal indicates the non-receipt of the authorization code,
   wherein upon receipt of the second signal by the fuel pump, the fuel pump is adapted to terminate operation, thereby rendering the vehicle inoperable.

4. The digital controller of claim 3, wherein the digital controller is communicably coupled to a power supply line of the fuel pump.

5. A vehicle operation termination system for rendering a vehicle inoperable for preventing unauthorized access of the vehicle, the vehicle comprising a fuel pump and an ignition switch, the vehicle operation termination system comprising:
   a distress switch configured to operate based on a user input; and
   a digital controller capable of being communicably coupled to the fuel pump, the ignition switch, and the distress switch, the digital controller comprising:
      a receiver configured to generate a first signal upon operation of the distress switch, wherein the receiver is further configured to receive an authorization code, the authorization code being unique to the vehicle and
      a timer communicably coupled to the receiver, the timer configured to transmit s second signal to the fuel pump after a predetermined delay from the generation of the first time signal, where the second signal indicates the non-receipt of the authorization code, wherein upon the receipt of the second signal by the fuel pump, the fuel pump is adapted to terminate operation, thereby rendering the vehicle inoperable.

6. The vehicle operation termination system of claim 5, wherein the digital controller is capable of being communicably coupled to a power supply line of the fuel pump.

7. The vehicle operation termination system of claim 5, wherein the distress switch is capable of being attached to a portion of the vehicle.

8. The vehicle operation termination system of claim 5, wherein upon the receipt of the authorization code by the receiver, the receiver is further configured to restore the operation of the fuel pump.

* * * * *